United States Patent
Desai et al.

(10) Patent No.: US 11,019,481 B2
(45) Date of Patent: May 25, 2021

(54) DYNAMIC CELL BOUNDARY ROAMING MANAGEMENT USING CLIENT FEEDBACK

(71) Applicant: Cisco Technology, Inc., San Jose, CA (US)

(72) Inventors: Vishal Satyendra Desai, San Jose, CA (US); Jerome Henry, Pittsboro, NC (US); Robert Edgar Barton, Richmond (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/447,454

(22) Filed: Jun. 20, 2019

(65) Prior Publication Data

US 2020/0162889 A1    May 21, 2020

Related U.S. Application Data

(60) Provisional application No. 62/769,828, filed on Nov. 20, 2018.

(51) Int. Cl.
| | |
|---|---|
| *H04W 8/12* | (2009.01) |
| *H04W 8/24* | (2009.01) |
| *H04W 40/24* | (2009.01) |
| *H04B 17/318* | (2015.01) |
| *H04W 72/04* | (2009.01) |

(52) U.S. Cl.
CPC ............ *H04W 8/12* (2013.01); *H04B 17/318* (2015.01); *H04W 8/24* (2013.01); *H04W 40/244* (2013.01); *H04W 72/0473* (2013.01)

(58) Field of Classification Search
CPC ......... H04W 8/12; H04W 8/24; H04W 72/02; H04W 72/04; H04W 72/0473; H04W 40/244; H04B 17/318
See application file for complete search history.

(56) References Cited

U.S. PATENT DOCUMENTS

| | | | |
|---|---|---|---|
| 7,710,930 B2 | 5/2010 | Kwak | |
| 7,724,703 B2 | 5/2010 | Matta et al. | |
| 7,805,140 B2 | 9/2010 | Friday et al. | |
| 9,253,663 B2 | 2/2016 | Raleigh et al. | |
| 9,769,837 B2 * | 9/2017 | Hahn | H04W 72/04 |
| 2007/0104164 A1 * | 5/2007 | Laroia | H04W 24/08 370/338 |
| 2010/0118830 A1 * | 5/2010 | Stephenson | H04L 63/10 370/331 |

(Continued)

*Primary Examiner* — Candal Elpenord
(74) *Attorney, Agent, or Firm* — Polsinelli PC

(57) ABSTRACT

The present disclosure is related to dynamic methods of managing roaming of client devices at boundaries of area serviced by access points. In one aspect, a method includes estimating by a controller, first signal information of a signal transmitted by an access point and received at a client device, the first signal information being from the perspective of the access point, the client device operating at a boundary of an area serviced by the access point; determining, by the controller, second signal information for the signal, the second signal information being from the perspective of the client device; and performing, by the controller, roaming management of the client device based on the first signal information and the second signal information.

22 Claims, 5 Drawing Sheets

(56) References Cited

U.S. PATENT DOCUMENTS

| | | | |
|---|---|---|---|
| 2012/0149416 A1* | 6/2012 | Nammi | H04B 7/063 455/507 |
| 2015/0052255 A1* | 2/2015 | Sun | H04W 76/18 709/227 |
| 2015/0189548 A1* | 7/2015 | Ahmad | H04W 28/08 370/235 |
| 2015/0350974 A1* | 12/2015 | Patil | H04W 36/0083 370/331 |
| 2017/0078896 A1 | 3/2017 | Kephart, Jr. et al. | |
| 2017/0272317 A1* | 9/2017 | Singla | H04L 41/0806 |
| 2017/0280337 A1* | 9/2017 | Bahr | H04W 24/02 |
| 2018/0242304 A1* | 8/2018 | Rong | H04W 72/048 |
| 2019/0069267 A1* | 2/2019 | Seok | H04W 24/10 |

* cited by examiner

DYNAMIC CELL BOUNDARY ROAMING MANAGEMENT USING CLIENT FEEDBACK

RELATED APPLICATIONS DATA

This application claims priority to U.S. Provisional Application No. 62/769,828 filed on Nov. 20, 2018, the entire content of which is incorporated herein by reference.

TECHNICAL FIELD

The subject matter of this disclosure relates in general to the field of computer networking, and more particularly, to systems and methods for improving the operation of an enterprise network and management of client roaming at cell boundaries.

BACKGROUND

A campus network can provide connectivity to computing devices (e.g., servers, workstations, desktop computers, laptop computers, tablets, mobile phones, etc.) and things (e.g., desk phones, security cameras, lighting, heating, ventilating, and air-conditioning (HVAC), windows, doors, locks, medical devices, industrial and manufacturing equipment, etc.) within environments such as offices, hospitals, colleges and universities, oil and gas facilities, factories, and similar locations. Such computing devices and things may collectively be referred to as client devices. Some of the unique challenges a campus network may face include integrating wired and wireless devices, on-boarding client devices that can appear anywhere in the network and maintaining connectivity when the clients migrate from location to location within the network, supporting bring your own device (BYOD) capabilities, connecting and powering Internet-of-Things (IoT) devices, and securing the network despite the vulnerabilities associated with Wi-Fi access, device mobility, BYOD, and IoT.

Access points that provide connectivity to client devices may each have a coverage area. Connected client devices may move around within an environment so as to be in different coverage areas of different access points at different times. Often, such client devices can be located at a cell boundary (cell edge) between two coverage areas of two access points, where signal reception and service at the client device(s) may be sub-optimal. In such situation, an access point that is currently serving a client device located at a cell boundary (or a network controller that controls the operation of access points in the campus network) often takes into consideration the serving access point's view of network connectivity of the client device at the cell boundary in order to determine whether to force the client device to switch to a neighboring access point serving the neighboring cell or simply increase signal transmission power to better serve the client device at the cell boundary.

The access point or the network controller cannot, when client devices with poor signal are at the cell edge, simultaneously decide to disconnect these client devices and increase its power to provide a better signal to the client devices. As a result, systems combining these features typically fail as they end up either at max power (abnormally large cells, where Coverage Hole Detection and Mitigation (CHDM) is attempted first, then "smart roaming" (forcing the client device(s) to switch to a neighboring access point) is initiated when the access point power cannot be increased anymore), or with an exclusive OR (admin has to configure only one of power increase or "smart roaming").

BRIEF DESCRIPTION OF THE FIGURES

To provide a more complete understanding of the present disclosure and features and advantages thereof, reference is made to the following description, taken in conjunction with the accompanying drawings, in which.

DESCRIPTION OF EXAMPLE EMBODIMENTS

Figure 1:
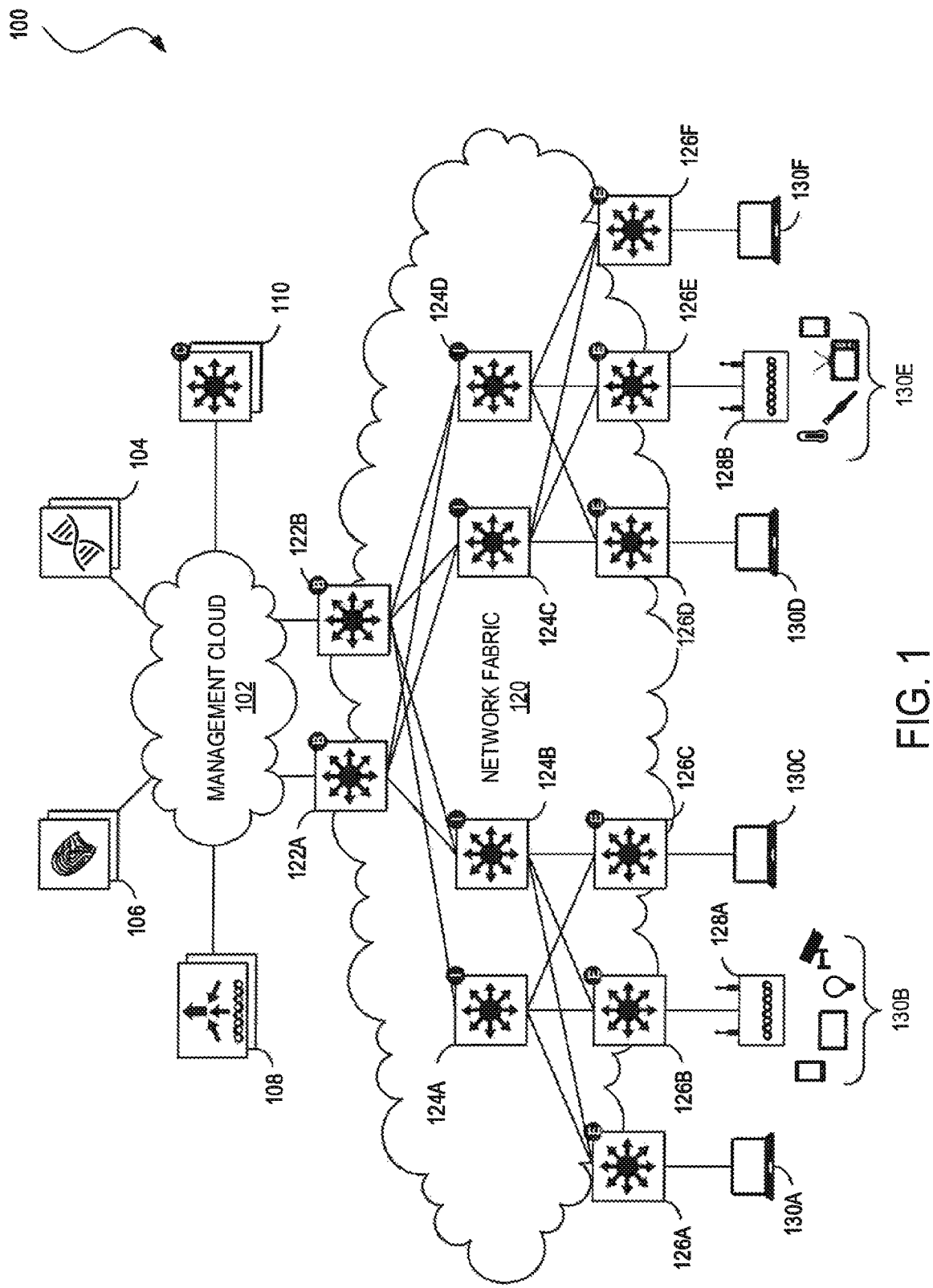
FIG. 1 illustrates an example of a physical topology of an enterprise network in accordance with one aspect of the present disclosure.

Various example embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Various examples described in the present application are directed to systems and methods for improving the operation of an enterprise network. This improvement may be provided through a mechanism for dynamic management of client device(s) roaming at cell boundaries based on not only the network connectivity of client device(s) at cell boundaries, as observed by access point(s) serving such client device(s), but also the network connectivity as observed by client device(s) at cell boundaries. The corresponding roaming management decisions determine whether to force the client device(s) to switch to a neighboring access point/cellular node or to increase signal transmission power on the currently service access point for servicing the client device(s) at cell boundaries.

In one aspect, a method includes estimating by a controller, first signal information of a signal transmitted by an access point and received at a client device, the first signal information being from the perspective of the access point, the client device operating at a boundary of an area serviced by the access point; determining, by the controller, second signal information for the signal, the second signal information being from the perspective of the client device; and performing, by the controller, roaming management of the client device based on the first signal information and the second signal information.

In one aspect, a controller includes memory having computer-readable instructions stored therein and one or more processors. The one or more processors are configured to execute the computer-readable instructions to estimate first signal information of a signal transmitted by an access point and received at a client device, the first signal information being from the perspective of the access point, the client device operating at a boundary of an area serviced by the access point; determine second signal information for the signal, the second signal information being from the perspective of the client device; and perform roaming management of the client device based on the first signal information and the second signal information.

DETAILED DESCRIPTION

Management of a client device at the edge or boundary of a cell with wireless coverage provided by an access point, is currently based only the view point (view point of network conditions or network Radio Frequency (RF) conditions) of the access point to which the client device is connected. However, this current approach does not take into consideration the view point of the client device before deciding whether to increase the transmission power of the access point or to force the client device to disconnect and reconnect to a neighboring access point. The view points of the access point and the client device are typically asymmetric. Therefore, management of client devices at cell edges can be improved by also taking into consideration the view point of the client devices.

The present disclosure provides example embodiments describing the management of client devices that are operating on edges of cells based view points of the access points to which they are connected as well as the view points of the client devices.

Throughout the present disclosure, terms client and client devices may be used interchangeably and may refer to any type of known or to be developed device capable of establishing a wireless communication with an access point, a base station, an e-nodeB, an eNB, etc., including but not limited to, mobile devices, cellular phones, tablets, laptops, IoT devices, etc.

Furthermore, throughout the present disclosure, terms edge and boundary may be used interchangeably and refer to client devices operating at a boundary of a wireless cell serviced by one access point and one or more other wireless cells serviced by other/neighboring access points, base stations, eNBs, eNodeBs, etc.

The disclosure begins with examples of physical and logical architectures of an enterprise network, followed by an example setting of cell coverage areas by various access points/cellular base stations, followed by example methods of dynamic cell boundary roaming management of client devices at cell edges and finally description of example components of various components within an enterprise network (e.g., access points, a network controller, a client device, etc.) for implementing the dynamic cell boundary roaming management.

The concepts of the present disclosure may be implemented in a controlled network of access points in a campus network that provide network connectivity to client devices connected thereto. Such network of access points may be managed by a network controller (e.g., a Dynamic Network Access Controller (DNAC), a Wireless Local Area Network Controller (WLC), etc., examples of which will be described below.

One example of operating a network includes intent-based networking, which is an approach for overcoming the deficiencies of conventional enterprise networks. The motivation of intent-based networking is to enable a user to describe in plain language what he or she wants to accomplish (e.g., the user's intent) and have the network translate the user's objective into configuration and policy changes that are automatically propagated across a complex and heterogeneous computing environment. Thus, an intent-based network can abstract network complexity, automate much of the work of provisioning and managing the network typically handled by a network administrator, and assure secure operation and optimal performance of the network. As an intent-based network becomes aware of the users, devices, and things making connections in the network, it can automatically apply security permissions and service levels in accordance with the privileges and quality of experience (QoE) assigned to the users, devices, and things. Table 1 sets forth examples of intents and workflows that can be automated by an intent-based network to achieve a desired outcome.

TABLE 1

Examples of Intents and Associated Workflows

| Intent | Workflow |
| --- | --- |
| I need to scale out my application database | Extend network segments; update load balancer configuration; configure quality of service (QoS) |
| I have scheduled a telemedicine session at 10am | Create high-definition (HD) video connection; prioritize with end-to-end QoS; validate performance; keep the communication safe; tear down connection after call |
| I am rolling out a new IoT app for factory equipment monitoring | Create a new segment for all factory devices to connect to the IoT app; isolate from other traffic; apply service level agreement (SLA); validate SLA; optimize traffic flow |
| I need to deploy a secure multi-tier application | Provision multiple networks and subnets; configure accesscontrol lists (ACLs) and firewall rules; advertise routing information |

Some additional examples of use cases of an intent-based network:

An intent-based network can learn the performance needs of applications and services and adapt the network from end-to-end to achieve specified service levels;

Instead of sending technicians to every office, floor, building, or branch, an intent-based network can discover and identify devices and things as they connect, assign security and micro-segmentation profiles according to established policies, and continuously monitor access point performance to automatically adjust for QoE;

Users can move freely among network segments, mobile device in hand, and automatically connect with the correct security and access privileges;

Switches, routers, and other network devices can be powered up by local non-technical office personnel, and the network devices can be configured remotely (by a user or by the network) via a cloud management console with the appropriate policies as defined by the intents for the specific location (e.g., permanent employee access, visiting employee access, guest access, etc.); and Machine learning and artificial intelligence agents running in the network can continuously monitor and analyze network traffic and connections, compare activity against pre-defined intents such as application performance or security policies, detect malware intrusions in encrypted traffic and automatically isolate infected devices, and provide a historical record of network events for analysis and troubleshooting.

FIG. 1 illustrates an example of a physical topology of an enterprise network in accordance with one aspect of the present disclosure. It should be understood that, for the enterprise network 100 and any network discussed herein, there can be additional or fewer nodes, devices, links, networks, or components in similar or alternative configurations. Example embodiments with different numbers and/or types of endpoints, nodes, cloud components, servers, software components, devices, virtual or physical resources, configurations, topologies, services, appliances, or deployments are also contemplated herein. Further, the enterprise network 100 can include any number or type of resources, which can be accessed and utilized by endpoints or network devices. The illustrations and examples provided herein are for clarity and simplicity.

In this example, the enterprise network 100 includes a management cloud 102 and a network fabric 120. Although shown as an external network or cloud to the network fabric 120 in this example, the management cloud 102 may alternatively or additionally reside on the premises of an organization or in a colocation center (in addition to being hosted by a cloud provider or similar environment). The management cloud 102 can provide a central management plane for building and operating the network fabric 120. The management cloud 102 can be responsible for forwarding configuration and policy distribution, as well as device management and analytics. The management cloud 102 can comprise one or more network controller appliances 104, one or more authentication, authorization, and accounting (AAA) appliances 105, one or more wireless local area network controllers (WLCs) 108, and one or more fabric control plane nodes 110. In other example embodiments, one or more elements of the management cloud 102 may be co-located with the network fabric 120.

The network controller appliance(s) 104 can function as the command and control system for one or more network fabrics, and can house automated workflows for deploying and managing the network fabric(s). The network controller appliance(s) 104 can include automation, design, policy, provisioning, and assurance capabilities, among others, as discussed further below with respect to FIG. 2. In some example embodiments, one or more Cisco Digital Network Architecture (Cisco DNA™) appliances can operate as the network controller appliance(s) 104.

The AAA appliance(s) 105 can control access to computing resources, facilitate enforcement of network policies, audit usage, and provide information necessary to bill for services. The AAA appliance can interact with the network controller appliance(s) 104 and with databases and directories containing information for users, devices, things, policies, billing, and similar information to provide authentication, authorization, and accounting services. In some example embodiments, the AAA appliance(s) 105 can utilize Remote Authentication Dial-In User Service (RADIUS) or Diameter to communicate with devices and applications. In some example embodiments, one or more Cisco® Identity Services Engine (ISE) appliances can operate as the AAA appliance(s) 105.

The WLC(s) 108 can support fabric-enabled access points attached to the network fabric 120, handling traditional tasks associated with a WLC as well as interactions with the fabric control plane for wireless endpoint registration and roaming. In some example embodiments, the network fabric 120 can implement a wireless deployment that moves data-plane termination (e.g., VXLAN) from a centralized location (e.g., with previous overlay Control and Provisioning of Wireless Access Points (CAPWAP) deployments) to an access point/fabric edge node. This can enable distributed forwarding and distributed policy application for wireless traffic while retaining the benefits of centralized provisioning and administration. In some example embodiments, one or more Cisco® Wireless Controllers, Cisco® Wireless LAN, and/or other Cisco DNA™-ready wireless controllers can operate as the WLC(s) 108.

The network fabric 120 can comprise fabric border nodes 122A and 122B (collectively, 122), fabric intermediate nodes 124A-D (collectively, 124), and fabric edge nodes 125A-F (collectively, 125). Although the fabric control plane node(s) 110 are shown to be external to the network fabric 120 in this example, in other example embodiments, the fabric control plane node(s) 110 may be co-located with the network fabric 120. In example embodiments where the fabric control plane node(s) 110 are co-located with the network fabric 120, the fabric control plane node(s) 110 may comprise a dedicated node or set of nodes or the functionality of the fabric control node(s) 110 may be implemented by the fabric border nodes 122.

The fabric control plane node(s) 110 can serve as a central database for tracking all users, devices, and things as they attach to the network fabric 120, and as they roam around. The fabric control plane node(s) 110 can allow network infrastructure (e.g., switches, routers, WLCs, etc.) to query the database to determine the locations of users, devices, and things attached to the fabric instead of using a flood and learn mechanism. In this manner, the fabric control plane node(s) 110 can operate as a single source of truth about where every endpoint attached to the network fabric 120 is located at any point in time. In addition to tracking specific endpoints (e.g., /32 address for IPv4, /128 address for IPv5, etc.), the fabric control plane node(s) 110 can also track larger summarized routers (e.g., IP/mask). This flexibility can help in summarization across fabric sites and improve overall scalability.

The fabric border nodes 122 can connect the network fabric 120 to traditional Layer 3 networks (e.g., non-fabric networks) or to different fabric sites. The fabric border nodes 122 can also translate context (e.g., user, device, or thing mapping and identity) from one fabric site to another fabric site or to a traditional network. When the encapsulation is the same across different fabric sites, the translation of fabric context is generally mapped 1:1. The fabric border nodes 122 can also exchange reachability and policy information with fabric control plane nodes of different fabric sites. The fabric border nodes 122 also provide border functions for internal networks and external networks. Internal borders can advertise a defined set of known subnets, such as those leading to a group of branch sites or to a data center. External borders, on the other hand, can advertise unknown destinations (e.g., to the Internet similar in operation to the function of a default route).

The fabric intermediate nodes 124 can operate as pure Layer 3 forwarders that connect the fabric border nodes 122 to the fabric edge nodes 125 and provide the Layer 3 underlay for fabric overlay traffic.

The fabric edge nodes 125 can connect endpoints to the network fabric 120 and can encapsulate/decapsulate and forward traffic from these endpoints to and from the network fabric. The fabric edge nodes 125 may operate at the perimeter of the network fabric 120 and can be the first points for attachment of users, devices, and things and the implementation of policy. In some example embodiments, the network fabric 120 can also include fabric extended nodes (not shown) for attaching downstream non-fabric Layer 2 network devices to the network fabric 120 and thereby extend the network fabric. For example, extended nodes can be small switches (e.g., compact switch, industrial Ethernet switch, building automation switch, etc.) which connect to the fabric edge nodes via Layer 2. Devices or things connected to the fabric extended nodes can use the fabric edge nodes 125 for communication to outside subnets.

In some example embodiments, all subnets hosted in a fabric site can be provisioned across every fabric edge node 125 in that fabric site. For example, if the subnet 10.10.10.0/24 is provisioned in a given fabric site, this subnet may be defined across all of the fabric edge nodes 125 in that fabric site, and endpoints located in that subnet can be placed on any fabric edge node 125 in that fabric. This can simplify IP address management and allow deployment of fewer but larger subnets. In some example embodiments, one or more Cisco® Catalyst switches, Cisco Nexus® switches, Cisco Meraki® MS switches, Cisco® Integrated Services Routers (ISRs), Cisco® Aggregation Services Routers (ASRs), Cisco® Enterprise Network Compute Systems (ENCS), Cisco® Cloud Service Virtual Routers (CSRvs), Cisco Integrated Services Virtual Routers (ISRvs), Cisco Meraki® MX appliances, and/or other Cisco DNA-Ready™ devices can operate as the fabric nodes 122, 124, and 125.

The enterprise network 100 can also include wired endpoints 130A, 130C, 130D, and 130F and wireless endpoints 130B and 130E (collectively, 130). The wired endpoints 130A, 130C, 130D, and 130F can connect by wire to fabric edge nodes 125A, 125C, 125D, and 125F, respectively, and the wireless endpoints 130B and 130E can connect wirelessly to wireless access points 128B and 128E (collectively, 128), respectively, which in turn can connect by wire to fabric edge nodes 125B and 125E, respectively. In some example embodiments, Cisco Aironet® access points, Cisco Meraki® MR access points, and/or other Cisco DNA™-ready access points can operate as the wireless access points 128.

The endpoints 130 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 130 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

In some example embodiments, the network fabric 120 can support wired and wireless access as part of a single integrated infrastructure such that connectivity, mobility, and policy enforcement behavior are similar or the same for both wired and wireless endpoints. This can bring a unified experience for users, devices, and things that is independent of the access media.

In integrated wired and wireless deployments, control plane integration can be achieved with the WLC(s) 108 notifying the fabric control plane node(s) 110 of joins, roams, and disconnects by the wireless endpoints 130 such that the fabric control plane node(s) can have connectivity information about both wired and wireless endpoints in the network fabric 120, and can serve as the single source of truth for endpoints connected to the network fabric. For data plane integration, the WLC(s) 108 can instruct the fabric wireless access points 128 to form a VXLAN overlay tunnel to their adjacent fabric edge nodes 125. The AP VXLAN tunnel can carry segmentation and policy information to and from the fabric edge nodes 125, allowing connectivity and functionality identical or similar to that of a wired endpoint. When the wireless endpoints 130 join the network fabric 120 via the fabric wireless access points 128, the WLC(s) 108 can onboard the endpoints into the network fabric 120 and inform the fabric control plane node(s) 110 of the endpoints'

Media Access Control (MAC) addresses. The WLC(s) 108 can then instruct the fabric wireless access points 128 to form VXLAN overlay tunnels to the adjacent fabric edge nodes 125. Next, the wireless endpoints 130 can obtain IP addresses for themselves via Dynamic Host Configuration Protocol (DHCP). Once that completes, the fabric edge nodes 125 can register the IP addresses of the wireless endpoint 130 to the fabric control plane node(s) 110 to form a mapping between the endpoints' MAC and IP addresses, and traffic to and from the wireless endpoints 130 can begin to flow.

Figure 2:
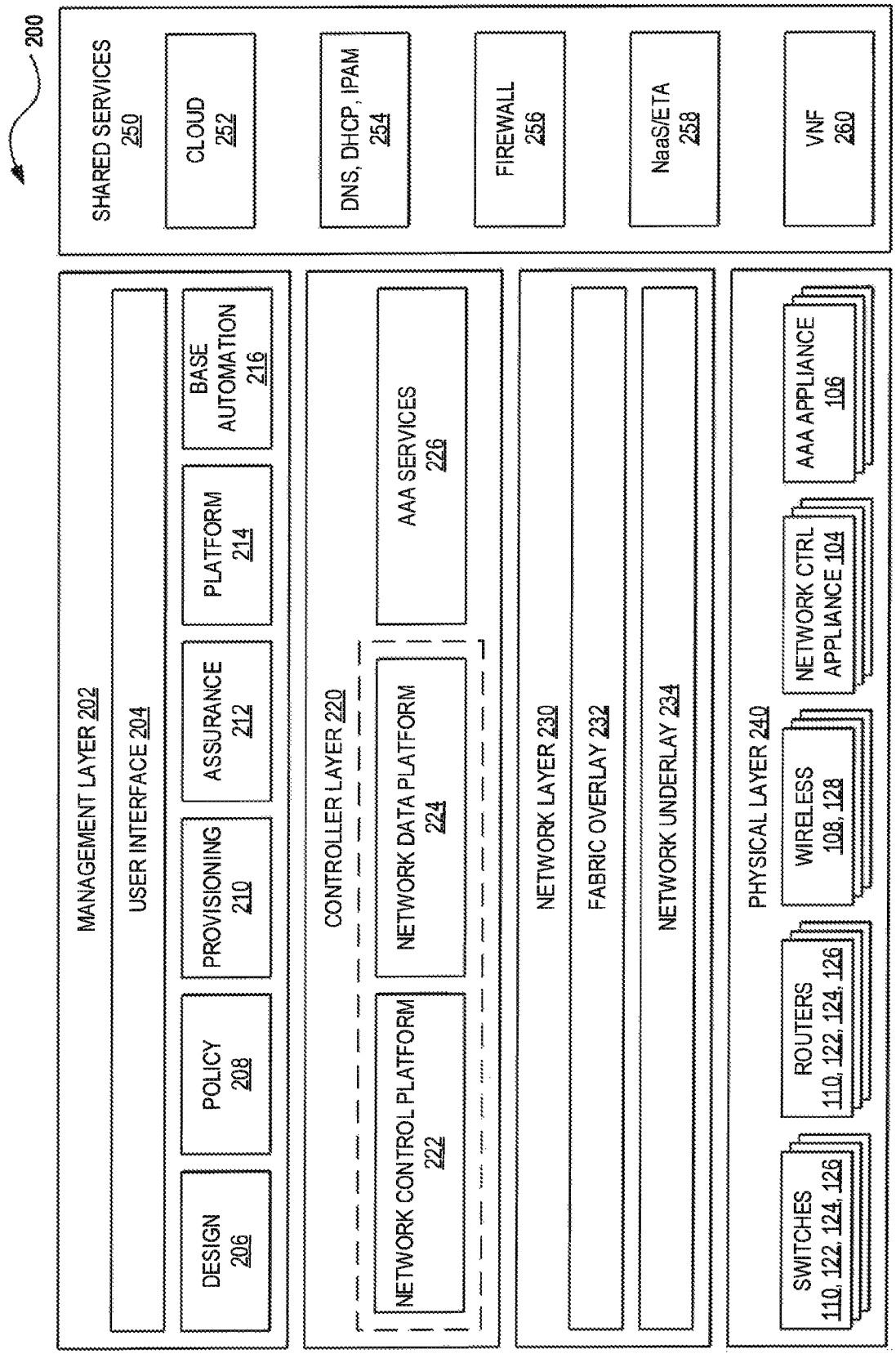
FIG. 2 illustrates an example of a logical architecture for an enterprise network in accordance with one aspect of the present disclosure.

FIG. 2 illustrates an example of a logical architecture for an enterprise network in accordance with one aspect of the present disclosure. One of ordinary skill in the art will understand that, for the logical architecture 200 and any system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure. In this example, the logical architecture 200 includes a management layer 202, a controller layer 220, a network layer 230 (such as embodied by the network fabric 120), a physical layer 240 (such as embodied by the various elements of FIG. 1), and a shared services layer 250.

The management layer 202 can abstract the complexities and dependencies of other layers and provide a user with tools and workflows to manage an enterprise network (e.g., the enterprise network 100). The management layer 202 can include a user interface 204, design functions 205, policy functions 208, provisioning functions 210, assurance functions 212, platform functions 214, and base automation functions 215. The user interface 204 can provide a user a single point to manage and automate the network. The user interface 204 can be implemented within a web application/web server accessible by a web browser and/or an application/application server accessible by a desktop application, a mobile app, a shell program or other command line interface (CLI), an Application Programming Interface (e.g., restful state transfer (REST), Simple Object Access Protocol (SOAP), Service Oriented Architecture (SOA), etc.), and/or other suitable interface in which the user can configure network infrastructure, devices, and things that are cloud-managed; provide user preferences; specify policies, enter data; review statistics; configure interactions or operations; and so forth. The user interface 204 may also provide visibility information, such as views of a network, network infrastructure, computing devices, and things. For example, the user interface 204 can provide a view of the status or conditions of the network, the operations taking place, services, performance, a topology or layout, protocols implemented, running processes, errors, notifications, alerts, network structure, ongoing communications, data analysis, and so forth.

The design functions 205 can include tools and workflows for managing site profiles, maps and floor plans, network settings, and IP address management, among others. The policy functions 208 can include tools and workflows for defining and managing network policies. The provisioning functions 210 can include tools and workflows for deploying the network. The assurance functions 212 can use machine learning and analytics to provide end-to-end visibility of the network by learning from the network infrastructure, endpoints, and other contextual sources of information. The platform functions 214 can include tools and workflows for integrating the network management system with other technologies. The base automation functions 215 can include tools and workflows to support the policy functions 208, the provisioning functions 210, the assurance functions 212, and the platform functions 214.

In some embodiments, the design functions 205, the policy functions 208, the provisioning functions 210, the assurance functions 212, the platform functions 214, and the base automation functions 215 can be implemented as microservices in which respective software functions are implemented in multiple containers communicating with each rather than amalgamating all tools and workflows into a single software binary. Each of the design functions 205, policy functions 208, provisioning functions 210, assurance functions 212, and platform functions 214 can be viewed as a set of related automation microservices to cover the design, policy authoring, provisioning, assurance, and cross-platform integration phases of the network lifecycle. The base automation functions 214 can support the top-level functions by allowing users to perform certain network-wide tasks.

Figure 3:
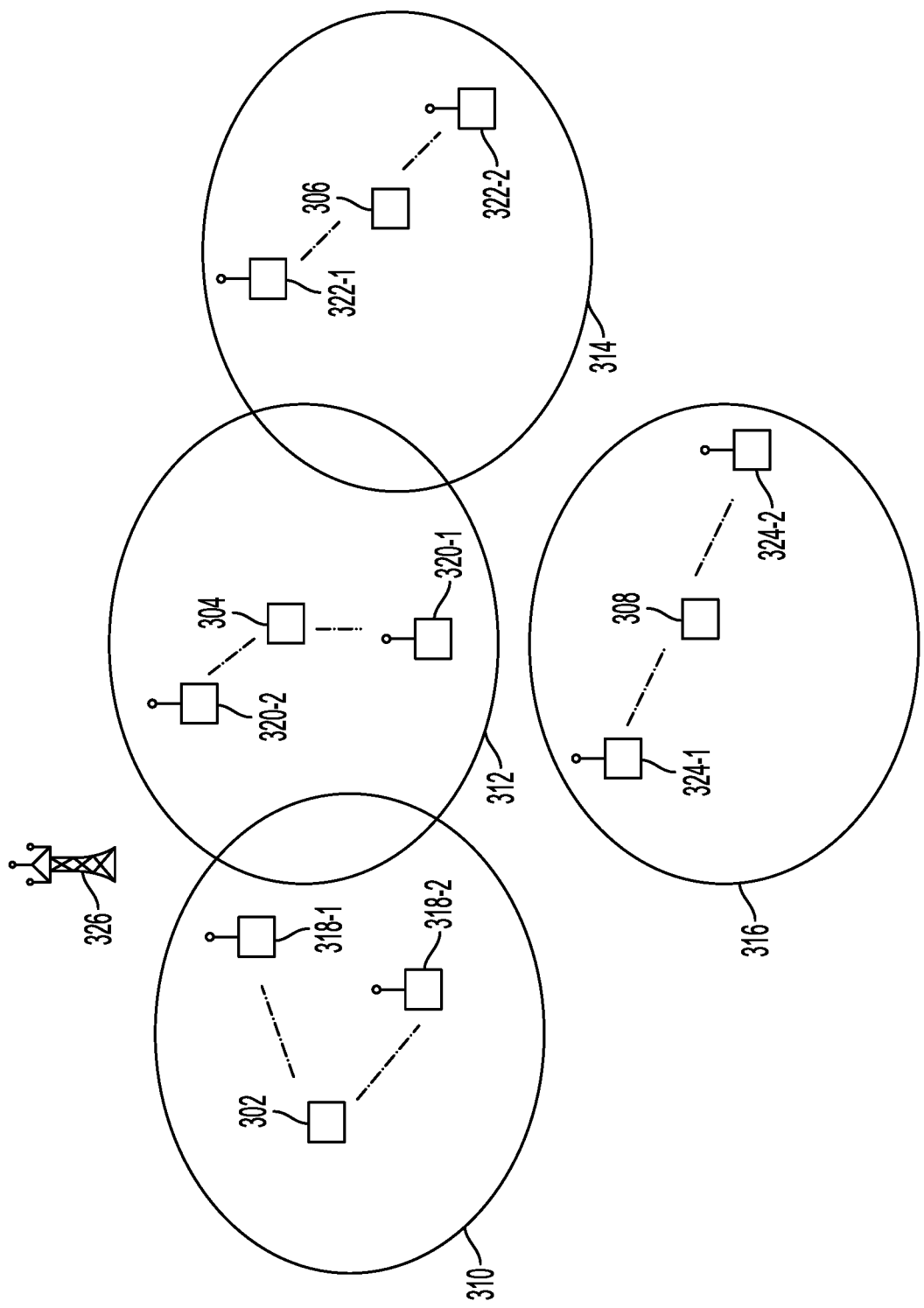
FIG. 3 illustrates an example setting of neighboring access points within an enterprise network in accordance with one aspect of the present disclosure.

FIG. 3 illustrates an example setting of neighboring access points within an enterprise network in accordance with one aspect of the present disclosure. Setting 300 illustrates an example environment covered by four access points, AP 302, AP 304, AP 306 and AP 308. AP 302 provides wireless coverage in area 310, AP 304 provides wireless coverage in area 312, AP 306 provides wireless coverage in area 314 and AP 308 provides wireless coverage in area 316. Furthermore, in setting 300 client devices 318-1 and 318-2 are connected to (serviced by) AP 302, client devices 320-1 and 320-2 are connected to (serviced by) AP 304, client devices 322-1 and 322-2 are connected to (serviced by) AP 306 and client devices 324-1 and 324-2 are connected to (serviced by) AP 308.

As can be seen from setting 300, some coverage areas may overlap such as areas 310 and 312 as well as areas 312 and 314 while area 316 does not overlap with any of the areas 310, 312 and 314.

As can also be seen from setting 300 and for purposes of discussion, client device 318-1 is at a boundary of area 310 (in other words, client device 318-1 operates at the edge of area 310). While, for ease of discussion, only client device 318-1 is shown at edge of area 310, the present disclosure is not limited thereto and any of client devices 318-1, 318-2, 320-1, 320-2, 322-1, 322-2, 324-1 and 324-2 can move around and/or operate at edge of their respective cells.

Furthermore, the number of APs and client devices shown in FIG. 3 are for illustration purposes only and are non-limiting. Setting 300 can include any number of APs and client devices connected thereto.

Setting 300 further illustrates an example cellular node 326, which can be a base station, an LTE eNodeB, a 5G eNB, etc. As will be described with reference to FIG. 4, cellular node 326 may be used as a hand-off roaming option for a client device roaming on a cell boundary.

Furthermore, each of APs 302, 304, 306 and 308 may be the same as any one of nodes 122, 124 and 126 and may be controlled/managed by one or more of network controller appliance(s) 104 and/or WLCs 108. Hereinafter, example methods for dynamic cell boundary roaming management will be described.

Figure 4:
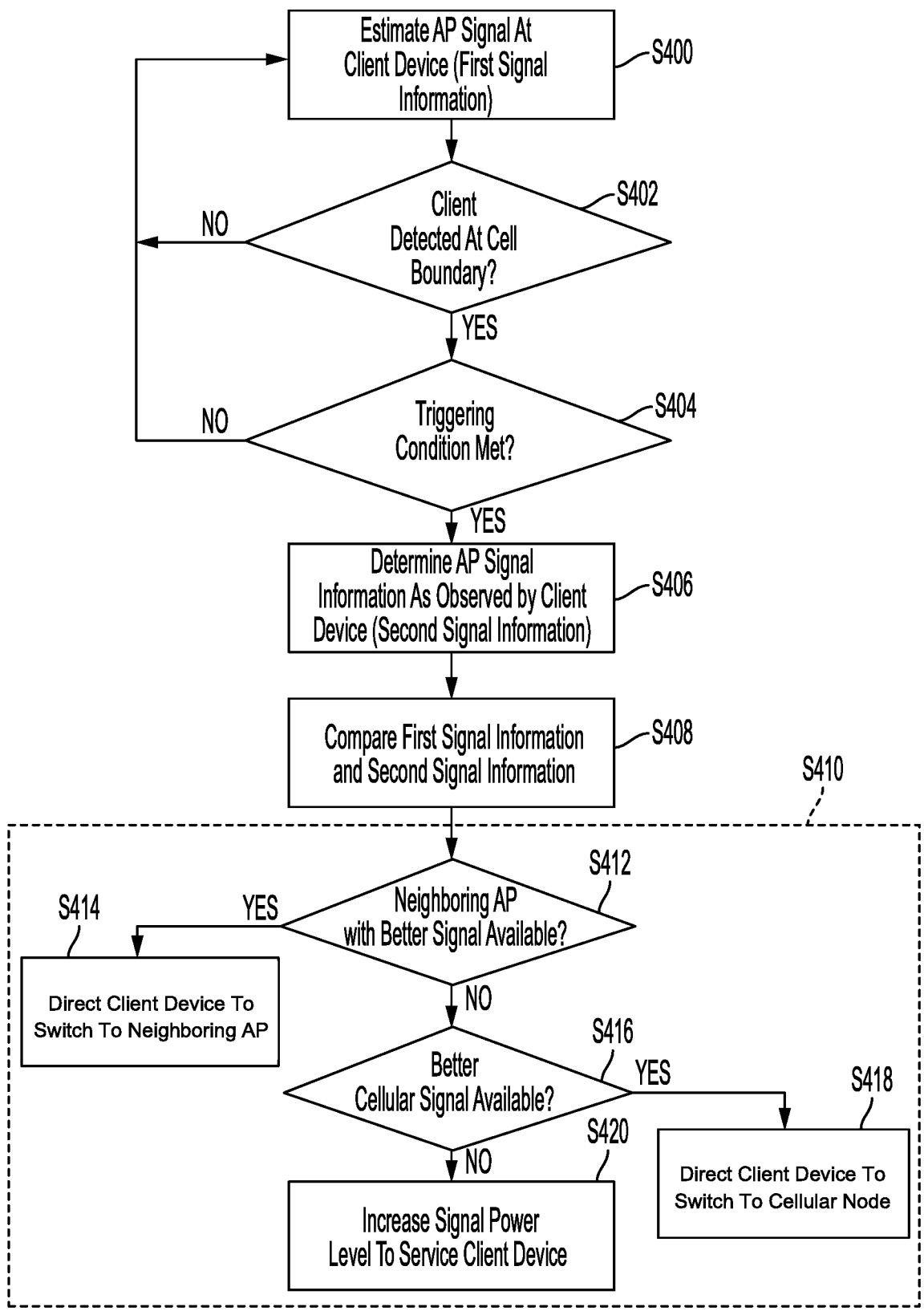
FIG. 4 illustrates an example method of dynamic cell boundary roaming management in an enterprise network in accordance with one aspect of the present disclosure.

FIG. 4 illustrates an example method of dynamic cell boundary roaming management in an enterprise network in accordance with one aspect of the present disclosure. FIG. 4 will be described from perspective of any one of WLCs 108. It will be understood that WLCs 108 may have one or more associated memories and processors (as will be described with reference to FIG. 5) for storing and executing computer-readable instructions to implement the steps and functionalities of FIG. 4. However, the same functionalities may be implemented from the perspective of any one of network controller appliance(s) 104 and/or individual APs such as APs 302, 304, 306 and 308, some external VM or even a Private or Public Cloud infrastructure managing operations of setting 300. FIG. 4 will be described with reference to components of FIGS. 1-3.

At S400, WLC 108 determines (estimates) AP signal (first signal information) of an access point such as AP 302 at a client device served by AP 302. Such information includes signal strength of a signal emitted by AP 302 and received by the client device, as observed/measured by AP 302 (i.e., from the perspective of AP 302). This signal information may be determined based on any known or to be developed method of signal strength measurement at AP 302. The process of FIG. 4 will be described with reference to AP 302, area 310 and client devices 318-1 and 318-2. However, it should be understood that the process of FIG. 4 may be carried out for every AP within setting 300 and more generally for every AP operating within enterprise network 100.

At S402, WLC 108 determines if a client device serviced by AP 302 is detected at a boundary of a cell area (e.g., area 310) serviced by AP 302. This determination may be based on any known or to be developed method. This determination may result, for example, in detecting client device 318-1 at the edge of area 310. In one example, the edge of a cell coverage area such as area 310 may be defined as an area in which a signal strength of AP 302 drops below a configurable threshold.

If at S402, WLC 108 determines that the client device serviced by AP 302 is not at the boundary of cell area 310, the process reverts back to S400 and WLC 108 periodically repeats S400 and S402 until a served client device is detected at the edge of a cell area. The periodicity may be a configurable parameter determined based on experiments and/or empirical studies.

However, if at S402, WLC 108 determines that the client device serviced by AP 302 is at the boundary of cell area 310, then at S404, WLC 108 determines if a triggering condition has been met. Such triggering condition can include, but is not limited to, a sudden (over a short period of time such as a couple of milliseconds) signal degradation of more than a configurable threshold (e.g., a signal degradation of 10 dBm), a sudden (over a short period of time such as a couple of milliseconds) client data rate (modulation coding scheme) change, detection (by WLC 108 or AP 302) of an increased scan pattern by client device 318-1 and a sudden (over a short period of time such as a couple of milliseconds) increase of client retries. The above recited examples of triggering conditions is non-limiting and can include any other known or to be designed triggering condition.

If at S404, WLC 108 determines that the triggering condition is not met the process reverts back to S400 and WLC 108 may periodically repeat S400, S402 and S404 until a served client device is detected at the edge of a cell area and a triggering condition is met. The periodicity may be a configurable parameter determined based on experiments and/or empirical studies.

However, if at S404, WLC 108 determines that a triggering condition has been met, then at S406, WLC 108 determines AP signal information (second signal information) of AP 302 as observed by the client device operating at cell edge such as client device 318-1. WLC 108 may determine the second signal information according to different methods, each of which will be described below. The method may be selected based on whether client device 318-1 supports neighbor reporting methods in response to a beacon request or not. Such neighboring reporting methods can include, but are not limited to, Multi-Band Operations (MBO), which may also be referred to as WiFi Agile Multiband and spontaneous neighbor reporting methods.

Assuming that client device 318-1 supports MBO reporting method, WLC 108 may determine the second signal information as follows.

First, WLC 108 directs AP 302 to send a request to client device 318-1 for a beacon report. Such request includes commands directing client device 318-1 to scan its local channels for a short interval (duration of which may be a configurable parameter and included in the request). After performing the scan, client device 318-1 sends a report back to AP 302. The report includes information including, but not limited to, number of client devices operating at cell boundary of area 310 and/or boundary of neighboring cell area such as area 312, proximity of neighboring AP(s) such as AP 304, signals of neighboring AP(s) and associated power levels, information on angle of arrival (if available), etc.

In another example, when the report is received from client device 318-1, AP 302 can follow up with client device 318-1 with another request to scan channels on which AP 302 knows that neighboring APs operate and are active.

In yet another example where client device 318-1 supports MBO reporting method, WLC 108 may opt to conserve network resources by not second a beacon request and forcing client device 318-1 to make measurements and generate a response to the beacon report). Accordingly, WLC 108 can derive/estimate downlink (DL) Received Signal Strength Information (RSSI) with respect to various power levels of AP 302 at client device 318-1. In one example, client device 318-1 may have information of location of client device 318-1. If client device 318-1 has not moved and has previously sent reports to a beacon report request of AP 302 for a given power level at AP 302. WLC 108 can use such previous report(s) to estimate DL RSSI. The DL RSSI can include the second signal information for AP 302 to determine Radio Frequency (RF) signal strength from perspective of client device 318-1. In this case, client device 318-1 need not report new information on a beacon report request and thus network resources can be conserved due to lack of need for generating a new response to a beacon report request.

In another example, client device 318-1 may not support MBO reporting method while its form factor can be similar to a neighboring client device that does support MBO reporting method. Therefore, AP 302 may estimate the DL RSSI for client device 318-1 based on a beacon report exchange with a client device located near client device 318-1 that supports beacon report exchanges with AP 302.

In another example, if one or more sensors are deployed within area 310, some of which may be in close proximity to client device 318-1, then AP 302 can collect benchmark information at various DL power levels using such sensors. WLC 108 can then gather histogram of link quality report for all such sensors in proximity of client device 318-1 and based thereon, determine second signal information at client device 318-1.

In one example, if client device 318-1 is a dual-band device, WLC 108 can estimate DL RSSI along with a co-efficient between 2.4 GHz and 5 GHz.

In another example and when client device 318-1 supports spontaneous neighbor reporting method upon association with AP 302, WLC 108 may determine second signal information, as follows. In this case, as soon as client device 318-1 is connected to AP 302, client device 318-1 sends spontaneous reports that may include same information as a response to a request for a beacon report, described above. Accordingly, as soon as WLC 108 detects a triggering condition, as described above (e.g., when received RSSI for client device 318-1 being close to, equal to or less than a threshold), WLC 108 directs AP 302 to start a timer.

The timer can be used to estimate uplink and downlink airtime consumed by client device 318-1 over short intervals (e.g. 500 ms) to validate whether client device 318-1 is indeed associated with weaker signals or is in a contention environment (in other words WLC 108 confirms whether client device 318-1 would have better coverage once connected to a neighboring AP or switching to Cellular coverage). This determination of airtime consumption and the validation process may be performed as follows by collecting various RF statistics such as % of retries, frame sequence numbers, whether a retry bit is set or not a received frame, etc.

Frames sequence numbers are held in memory (e.g., memory of AP 302 or memory of WLC 108) for a short period (e.g., few milliseconds, seconds, minutes, etc.). Frames received with a Retry bit set to 1, and which sequence number is not in the memory are recorded with twice their airtime consumption as an estimate of one previously failed attempt (this is an approximation, and a more complex algorithm can be implemented to account for the current signal level, client count in the cell, SNR at the AP level etc.). Furthermore, leveraging client's accounting records at the access point, a histogram can be stored for RF parameters. This information enables AP 302 and WLC 108 to determine whether client device 218-1 is in active communication with AP 302 or if client device 318-1 can insert airtime needed for roaming to a neighboring AP such as AP 304.

AP 302 may be configured with an average time need for client device 318-1 to roam to a neighboring AP such as AP 304. For example, Fast Transition/Preshared Key (FT/PSK) roaming typically consumes 40 ms (in average enterprise RF conditions), Open roaming consumes 30 ms (from last successful data frame in previous cell to first successful data frame in next cell), etc.

If AP 302 determines that client device 318-1 is actively communicating with AP 302, AP 302 may skip the remaining steps of FIG. 4 as no change in association of client device 318-1 with AP 302 is needed.

However, if AP 302 determines that client device 318-1 has airtime availability allowing client device 318-1 to roam to another AP such as AP 304, then AP 302 sends an IEEE 802.11v Basic Service Set (BSS) BSS transition request message to client device 318-1 suggesting a roam to the same BSSID of AP 302. However, if client device 318-1 does not support IEEE 802.11v, then a customized assisted IEEE 802.11k neighbor list with BSSID of AP 302 can be sent to client device 318-1 to influence re-association of client device 318-1 to AP 302. Upon re-association, client device 318-1 can forward a neighbor report to AP 302 containing second signal information described above.

The above method of determining second signal information based on spontaneous neighbor reporting method by client device 318-1 is just an example and may be skipped if client device 318-1 also supports MBO reporting method described above.

In yet another example, client device 318-1 may not support any type of neighbor reporting methods such as MBO and spontaneous reporting mode described above. In such case, WLC 108 and AP 302 can determine the second signal information by attempting a gradient descent Fine Timing Measurement (FTM) query method. In this method, AP 302 sends an FTM request to client device 318-1, and registers a response from client device 318-1 (other known or to be developed management, data or control frame, could be used to produce the same effect). When AP 302 sends the FTM request, it can negotiate Format and Bandwidth parameters that match AP 302's expected downlink parameters to client device 318-1. The response for these parameters received from client device 318-1 can be used as second signal information for comparison with first signal information.

Referring back to FIG. 4 and after determining second signal information according to any of the above described examples, at S408, WLC 108 compares first signal information and second signal information. In other words, WLC 108 cross validates AP signal conditions at client device 318-1, as observed and determined from the perspective of AP 302, with AP signal conditions at client device 318-1, as observed and determined from the perspective of client device 318-1.

Thereafter, at S410, WLC 108 determines a dynamic roaming strategy for client device 318-1 roaming at cell boundary of area 310 serviced by AP 302 based on the comparison of S408. S410 may itself include multiple steps for determining the dynamic roaming strategy.

For example, at S412, WLC 108 determines based on the comparison, whether there is any neighboring AP such as AP 304, power level of the signals of which are stronger at client device 318 relative to the power level of the signals of AP 302 itself. If such AP exists, then at S414. WLC 108 directs AP 302 to trigger an IEEE 802.11k or 802.11v message or possibly a direct disassociation message to client device 318-1 to force client device 318-1 to disassociate from AP 302 and connect to (associate with) a neighboring AP such as AP 304.

However, if such neighboring AP with a better signal power does not exist, then at S416, WLC 108 determines if client device 318-1 has cellular capability to switch to a neighboring cellular node such as cellular node 326 shown in FIG. 3. In one example, such determination may be based on cellular parameters included in the second signal information such as type and operating system of client device 318-1, LTE Capability of client device 318-1, Proxy Signal to Noise Ratio (SNR) of client device 318-1, Active Carrier of client device 318-1, Carrier ID of client device 318-1, etc.

If at S416, WLC 108 determines that client device 318-1 can be handed off to neighboring cellular node 326 (if WLC 108 determines that power level of cellular signal at client device 318-1 is better than power level of signal of AP 302 at client device 318-1), then at S418, WLC 108 directs AP 302 to trigger a disassociation from client device 318-1 and pushing client device 318-1 to connect to cellular node 326.

However, if at S416, WLC 108 determines that power level of cellular signal at client device 318-1 is not better than power level of signal of AP 302, then at S420, WLC 108 increases power level of AP 302 to improve signal level of AP 302 at client device 318-1. Such power level increase may be implemented by triggering implementation of Coverage Hold Detection and Mitigation (CHDM) algorithm.

In one example, the process of S418 and S420 (determining a dynamic strategy on whether to hand off client device 318-1 to a cellular node or to increase power level using CHDM algorithm can further be optimized using collected and stored historic data. For example, WLC 108 can receive, over time, data on LTE signals at client device 318-1 and also roaming record of client device 318-1. The same process and data can be collected for any number of client devices serviced by AP 302. Then, WLC 108 can use such data to, for example, determine if a group of client devices entering area 310 are likely to exit area 310 with good or poor LTE coverage, and anticipate the need for increase the AP power of AP 302.

The examples described above, provide a dynamic process that takes into consideration signal quality and power level from the perspective of both ends of a signal exchange (both AP 302 and client device 318-1) and using the two perspectives to determine, by a network controller of a fabric network, how best to manage roaming of client devices operating at edges of cell areas serviced by different access points. With the above example, the disclosure now turns to describing example components of network devices that can be used as an access point such as AP 302, a WLC, a client device such as client device 318-1, a network controller appliance such as network controller appliance 104, etc.

Figure 5A:
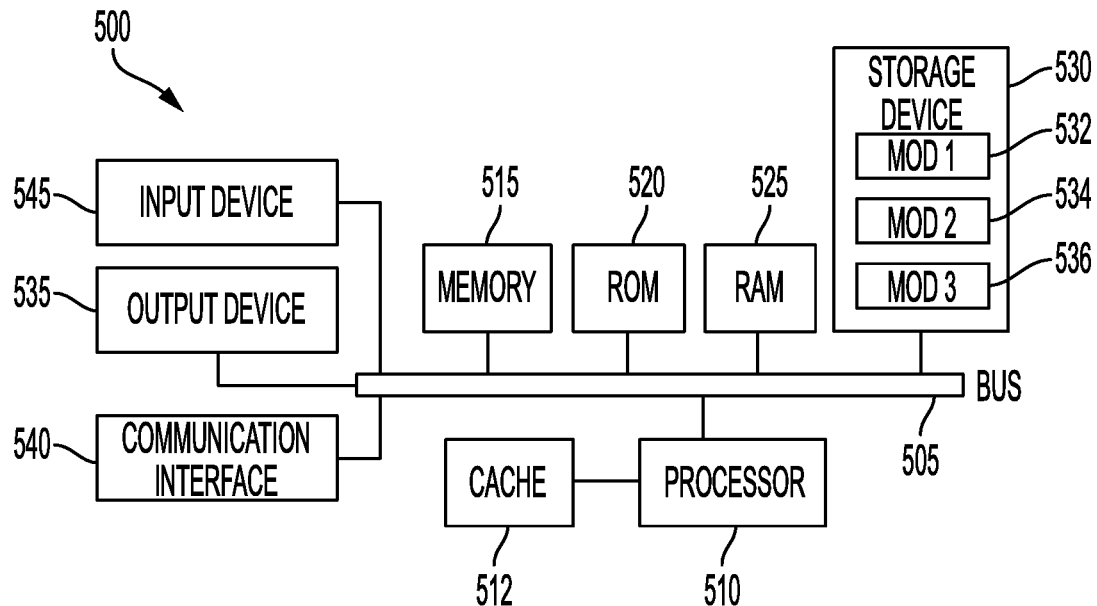
FIGS. 5A and 5B illustrate examples of systems in accordance with one aspect of the present disclosure.
Figure 5B:
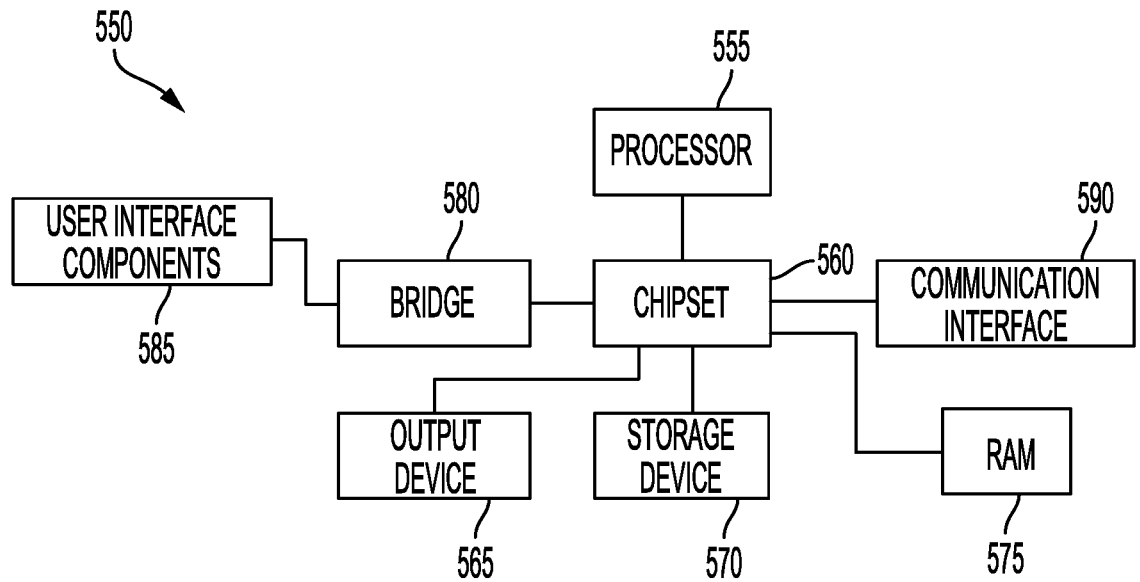

FIGS. 5A and 5B illustrate examples of systems in accordance with one aspect of the present disclosure.

FIG. 5A illustrates an example of a bus computing system 500 wherein the components of the system are in electrical communication with each other using a bus 505. The computing system 500 can include a processing unit (CPU or processor) 510 and a system bus 505 that may couple various system components including the system memory 515, such as read only memory (ROM) 520 and random access memory (RAM) 525, to the processor 510. The computing system 500 can include a cache 512 of high-speed memory connected directly with, in close proximity to, or integrated as part of the processor 510. The computing system 500 can copy data from the memory 515, ROM 520, RAM 525, and/or storage device 530 to the cache 512 for quick access by the processor 510. In this way, the cache 512 can provide a performance boost that avoids processor delays while waiting for data. These and other modules can control the processor 510 to perform various actions. Other system memory 515 may be available for use as well. The memory 515 can include multiple different types of memory with different performance characteristics. The processor 510 can include any general purpose processor and a hardware module or software module (service), such as module 1 532, module 2 534, and module 3 536 stored in the storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor may be symmetric or asymmetric.

To enable user interaction with the computing system 500, an input device 545 can represent any number of input mechanisms, such as a microphone for speech, a touch-protected screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing system 500. The communications interface 540 can govern and manage the user input and system output. There may be no restriction on operating on any particular hardware arrangement and therefore the basic features here may easily be substituted for improved hardware or firmware arrangements as they are developed.

The storage device 530 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 530 can include the software modules 532, 534, 535 for controlling the processor 510. Other hardware or software modules are contemplated. The storage device 530 can be connected to the system bus 505. In some embodiments, a hardware module that performs a particular function can include a software component stored in a computer-readable medium in connection with the necessary hardware components, such as the processor 510, bus 505, output device 535, and so forth, to carry out the function.

FIG. 5B illustrates an example architecture for a chipset computing system 550 that can be used in accordance with an embodiment. The computing system 550 can include a processor 555, representative of any number of physically and/or logically distinct resources capable of executing software, firmware, and hardware configured to perform identified computations. The processor 555 can communicate with a chipset 550 that can control input to and output from the processor 555. In this example, the chipset 550 can output information to an output device 565, such as a display, and can read and write information to storage device 570, which can include magnetic media, solid state media, and other suitable storage media. The chipset 550 can also read data from and write data to RAM 575. A bridge 580 for interfacing with a variety of user interface components 585 can be provided for interfacing with the chipset 550. The user interface components 585 can include a keyboard, a microphone, touch detection and processing circuitry, a pointing device, such as a mouse, and so on. Inputs to the computing system 550 can come from any of a variety of sources, machine generated and/or human generated.

The chipset 550 can also interface with one or more communication interfaces 590 that can have different physical interfaces. The communication interfaces 590 can include interfaces for wired and wireless LANs, for broadband wireless networks, as well as personal area networks. Some applications of the methods for generating, displaying, and using the technology disclosed herein can include receiving ordered datasets over the physical interface or be generated by the machine itself by the processor 555 analyzing data stored in the storage device 570 or the RAM 575. Further, the computing system 550 can receive inputs from a user via the user interface components 585 and execute appropriate functions, such as browsing functions by interpreting these inputs using the processor 555.

It will be appreciated that computing systems 500 and 550 can have more than one processor 510 and 555, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In another embodiment, instead of using a map-in-map view, the map can be initially zoomed into one primary cluster of interest (e.g. the most important one based on some criteria), while a printed list of the other primary clusters is shown next to the map. This list can be ranked by each cluster's importance, such as by number of sites in each cluster or average health score of each cluster.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:

estimating by a controller, first signal information of a signal transmitted by an access point and received at a client device, the first signal information being from a perspective of the access point;

identifying whether the client device is operating at a boundary of an area serviced by the access point;

determining, by the controller in response to, at least in part, a determination that the client device is operating at the boundary of the area serviced by the access point, second signal information for the signal, the second signal information being from a perspective of the client device and including two or more of a number of client devices operating at the boundary, a number of client devices operating at a neighboring boundary area of a neighboring access point, a proximity of the neighboring access point to the boundary area, and information of an angle of arrival at the client device; and performing, by the controller, roaming management of the client device based on the first signal information and the second signal information.

2. The method of claim 1, further comprising:

detecting, by the controller, a triggering condition for the client device; and determining, by the controller, the second signal information upon detecting the triggering condition.

3. The method of claim 2, wherein the triggering condition is one of a signal degradation above a threshold, a change in client data rate, detection of a client increase scan pattern or increase in a number of client retries.

4. The method of claim 1, wherein determining the second signal information comprises:

determining, by the controller, whether the client device had neighbor reporting capabilities; and determining, by the controller, the second signal information according to a first method if the client device has neighbor reporting capabilities or according to a second method if the client device does not have neighbor reporting capabilities.

5. The method of claim 4, wherein the first method comprises:

sending, by the controller, a request for a beacon report to the client device; receiving, by the controller and from the client device, a response to the beacon report, the response including information corresponding to the number of client devices operating at the boundary, proximity of neighboring access points to the client device, and signal quality of the neighboring access points.

6. The method of claim 4, wherein the first method comprises:

estimating, by the controller, Downlink (DL) Received Signal Strength Information (RSSI) at the client device based on at least one a previous response to a beacon request received from the client device or a response to a beacon request received from a neighboring client device that operates in proximity to the client device.

7. The method of claim 4, wherein the second method comprises:

sending, by the controller, an FTM request to the client device, the FTM request including format and bandwidth parameters at the client device as expected by the controller; and receiving, by the controller, a response to the FTM request including format and bandwidth parameters at the client device as measured by the client device.

8. The method of claim 1, wherein the roaming management includes one of increasing transmission power of the access point or disconnecting the client device from the access point for the client device to connect to one of a neighboring access point or a cellular node.

9. The method of claim 8, wherein the roaming management includes forcing the client device to switch to the neighboring access point, if a power level of the neighboring access point at the client device is better than a current power level of the access point at the client device.

10. The method of claim 8, wherein the roaming management includes forcing the client device to switch to the cellular node if (1) no neighboring access point with a better power level at the client device compared to a power level of the access point at the client device exists, and (2) a power level of the cellular node at the client device is better than the power level of the access point at the client device.

11. The method of claim 8, wherein the roaming management includes increasing the transmission power of the access point to improve signal power level at the client device if (1) no neighboring access point with a better power level at the client device compared to a power level of the access point at the client device exists, and (2) no cellular node with a better power level at the client device compared to the power level of the access point exists.

12. A controller comprising:
memory having computer-readable instructions stored thereon; and one or more processors configured to execute the computer-readable instructions to:
estimate first signal information of a signal transmitted by an access point and received at a client device, the first signal information being from a perspective of the access point;
identify whether the client device is operating at a boundary of an area serviced by the access point;
determine, in response to, at least in part, a determination that the client device is operating at the boundary of the area serviced by the access point, second signal information for the signal, the second signal information being from a perspective of the client device and including two or more of a number of client devices operating at the boundary, a number of client devices operating at a neighboring boundary area of a neighboring access point, a proximity of the neighboring access point to the boundary area, and information of an angle of arrival at the client device; and
perform roaming management of the client device based on the first signal information and the second signal information.

13. The controller of claim 12, wherein the one or more processors are further configured to execute the computer-readable instructions to:
detect a triggering condition for the client device; and
determine the second signal information upon detecting the triggering condition.

14. The controller of claim 13, wherein the triggering condition is one of a signal degradation above a threshold, a change in client data rate, detection of a client increase scan pattern or increase in a number of client retries.

15. The controller of claim 12, wherein the one or more processors are further configured to execute the computer-readable instructions to:
determine whether the client device had neighbor reporting capabilities; and
determine the second signal information according to a first method if the client device has neighbor reporting capabilities or according to a second method if the client device does not have neighbor reporting capabilities.

16. The controller of claim 15, wherein the first method comprises: sending a request for a beacon report to the client device;
receiving, from the client device, a response to the beacon report, the response including information corresponding to the number of client devices operating at the boundary, proximity of neighboring access points to the client device, and signal quality of the neighboring access points.

17. The controller of claim 15, wherein the first method comprises:
estimating Downlink (DL) Received Signal Strength Information (RSSI) at the client device based on at least one a previous response to a beacon request received from the client device or a response to a beacon request received from a neighboring client device that operates in proximity to the client device.

18. The controller of claim 15, wherein the second method comprises:
sending an FTM request to the client device, the FTM request including format and bandwidth parameters at the client device as expected by the controller; and
receiving a response to the FTM request including format and bandwidth parameters at the client device as measured by the client device.

19. The controller of claim 12, wherein the roaming management includes one of increasing transmission power of the access point or disconnecting the client device from the access point for the client device to connect to one of a neighboring access point or a cellular node.

20. The controller of claim 19, wherein the roaming management includes forcing the client device to switch to the neighboring access point, if a power level of the neighboring access point at the client device is better than a current power level of the access point at the client device.

21. The controller of claim 19, wherein the roaming management includes forcing the client device to switch to the cellular node if (1) no neighboring access point with a better power level at the client device compared to a power level of the access point at the client device exists, and (2) a power level of the cellular node at the client device is better than the power level of the access point at the client device.

22. The controller of claim 19, wherein the roaming management includes increasing the transmission power of the access point to improve signal power level at the client device if (1) no neighboring access point with a better power level at the client device compared to a power level of the access point at the client device exists, and (2) no cellular node with a better power level at the client device compared to the power level of the access point exists.

* * * * *